(12) United States Patent
Wallace et al.

(10) Patent No.: US 8,048,311 B2
(45) Date of Patent: Nov. 1, 2011

(54) METHODS AND SYSTEMS FOR ZERO DISCHARGE WATER TREATMENT

(75) Inventors: Paul Steven Wallace, Katy, TX (US); James Michael Storey, Houston, TX (US); Aaron John Avagliano, Houston, TX (US)

(73) Assignee: General Electric Company, Schenectady, NY (US)

( * ) Notice: Subject to any disclaimer, the term of this patent is extended or adjusted under 35 U.S.C. 154(b) by 349 days.

(21) Appl. No.: 12/349,213

(22) Filed: Jan. 6, 2009

(65) Prior Publication Data

US 2010/0172819 A1    Jul. 8, 2010

(51) Int. Cl.
*B01D 61/00* (2006.01)
*B01D 63/00* (2006.01)
*F25B 1/00* (2006.01)

(52) U.S. Cl. ........ 210/652; 210/650; 210/651; 210/257; 210/195.2; 210/195.1; 210/175; 210/180; 62/115; 95/55; 166/120; 166/266

(58) Field of Classification Search .......... 210/650–652, 210/195.2, 257.2, 175, 180; 95/55; 166/120, 166/266; 62/115
See application file for complete search history.

(56) References Cited

U.S. PATENT DOCUMENTS

| | | | |
|---|---|---|---|
| 4,432,417 A * | 2/1984 | Bowyer | 166/120 |
| 4,434,057 A | 2/1984 | Marquardt | |
| 5,071,540 A * | 12/1991 | Culross et al. | 208/414 |
| 5,336,409 A | 8/1994 | Hachisuka et al. | |
| 5,374,333 A | 12/1994 | Nykanen et al. | |
| 5,576,057 A | 11/1996 | Hirose et al. | |
| 5,925,223 A | 7/1999 | Simpson et al. | |
| 6,613,125 B1 * | 9/2003 | Wallace et al. | 95/55 |
| 7,305,724 B2 * | 12/2007 | Rozental et al. | 4/665 |
| 7,318,894 B2 * | 1/2008 | Juby et al. | 210/603 |
| 7,591,309 B2 * | 9/2009 | Minnich et al. | 166/266 |
| 7,718,069 B2 * | 5/2010 | Laraway et al. | 210/652 |
| 7,847,923 B2 * | 12/2010 | Pittaro et al. | 356/28 |

\* cited by examiner

*Primary Examiner* — Ana Fortuna
(74) *Attorney, Agent, or Firm* — Armstrong Teasdale LLP

(57) ABSTRACT

Methods and systems for a zero discharge waste water treatment system are provided. The system includes a filtration train including filter media having successively smaller diameter filtration elements, a reverse osmosis apparatus including a pump and a membrane coupled in flow communication with said filtration train, a vapor compressor coupled in flow communication with said reverse osmosis apparatus, and a spray dryer coupled in flow communication with said vapor compressor, said spray dryer configured to separate moisture in a brine solution from particulate suspended in the brine solution.

20 Claims, 2 Drawing Sheets

METHODS AND SYSTEMS FOR ZERO DISCHARGE WATER TREATMENT

BACKGROUND OF THE INVENTION

This invention relates generally to integrated gasification combined-cycle (IGCC) power generation systems, and more specifically to methods and systems for integrated water treatment of IGCC process water.

At least some known IGCC power plants generate large amounts of waste water and therefore require large amounts of make-up water. Siting versatility dictates using as little make-up water as possible and government regulations tend to require less waste water discharge off site. Initially designing a plant for zero wastewater discharge garners community acceptance and streamlines the permitting process. Recycling wastewater greatly decreases the amount of makeup water that must be purchased from the local utility and eliminates the local control and costs of sewer disposal. Wastewater recycling also allows a greater freedom in selecting a site for an industrial plant because there are fewer concerns about adequate water supply. In many cases, poor quality water can be used for make-up since it is upgraded in-house. For example, at several zero discharge sites, secondary sewage effluent or wastewater from other industrial sites is used as make-up.

Clean water laws such as the National Pollution Discharge Elimination System (NPDES) and the implementation of similar "zero liquid discharge" regulations at the local level are spurring treating highly saturated brine wastewaters such as cooling tower blowdown, which had previously been dumped into rivers. These wastewaters, saturated with calcium sulfate and silica, are difficult to evaporate because they are already at the scaling point. Current zero discharge waste water treating systems use a vapor recompression system, a forced circulation evaporator, and a spray dryer in series to treat process waste water. Frequent vaporizer system cleaning is required due to calcium and silica scaling. In addition the system has a high capital cost and power consumption since the chloride content in the gasification water system water is limited to 3500 parts per million (ppm). Higher chloride content in the gasification water system causes low pH values and corrosion since chloride recycled to the gasifier produces hydrochloric (HCl) acid.

Purified ammonium chloride recovered from wastewater can be sold as a byproduct to the fertilizer industry. The ammonium component is soluble and promotes plant growth. The chloride component is also soluble and provides soil chemistry balancing for low chloride soils.

BRIEF DESCRIPTION OF THE INVENTION

In one embodiment, a system for a zero discharge waste water treatment system includes a filtration train including filter media having successively smaller diameter filtration elements, a reverse osmosis apparatus including a pump and a membrane coupled in flow communication with the filtration train, a vapor compressor coupled in flow communication with the reverse osmosis apparatus, and a spray dryer coupled in flow communication with the vapor compressor, the spray dryer configured to separate moisture in a brine solution from particulate suspended in the brine solution.

In another embodiment, a method of treating waste liquids from a process includes generating a third waste stream including a precipitate by combining a first waste stream and a second waste stream, filtering the third waste stream such that the precipitate is substantially removed from the third waste stream, filtering silica from at least a portion of the filtered waste stream using an ultrafiltration membrane, filtering the substantially silica free waste stream using a nanofiltration membrane such that substantially all formates and remaining calcium are removed from the permeate and the formate is concentrated in the retentate, and pressurizing the nanofiltered permeate on a high pressure side of a reverse osmosis membrane to generate permeate on the low pressure side that is substantially free of chlorides and to generate retentate including a relatively high concentration of chlorides.

In yet another embodiment, an integrated gasification combined-cycle (IGCC) power generation system includes a gasifier including a blowdown system configured to remove blowdown water with a relatively high concentration of impurities from the gasifier wherein the relatively high concentration of impurities includes at least one of about 3000 parts per million (ppm) chlorides, about 1000 ppm formate, and calcium at about saturation concentration, a condensate stripper configured to separate ammonia entrained in a gasifier process condensate stream from the condensate, and a waste treatment system configured to process the blowdown water and the stripped ammonia into waste streams that are at least one of recycled back into the gasifier and collected as a solid waste such that the waste stream produces substantially zero liquid discharge.

DETAILED DESCRIPTION OF THE INVENTION

Figure 1:
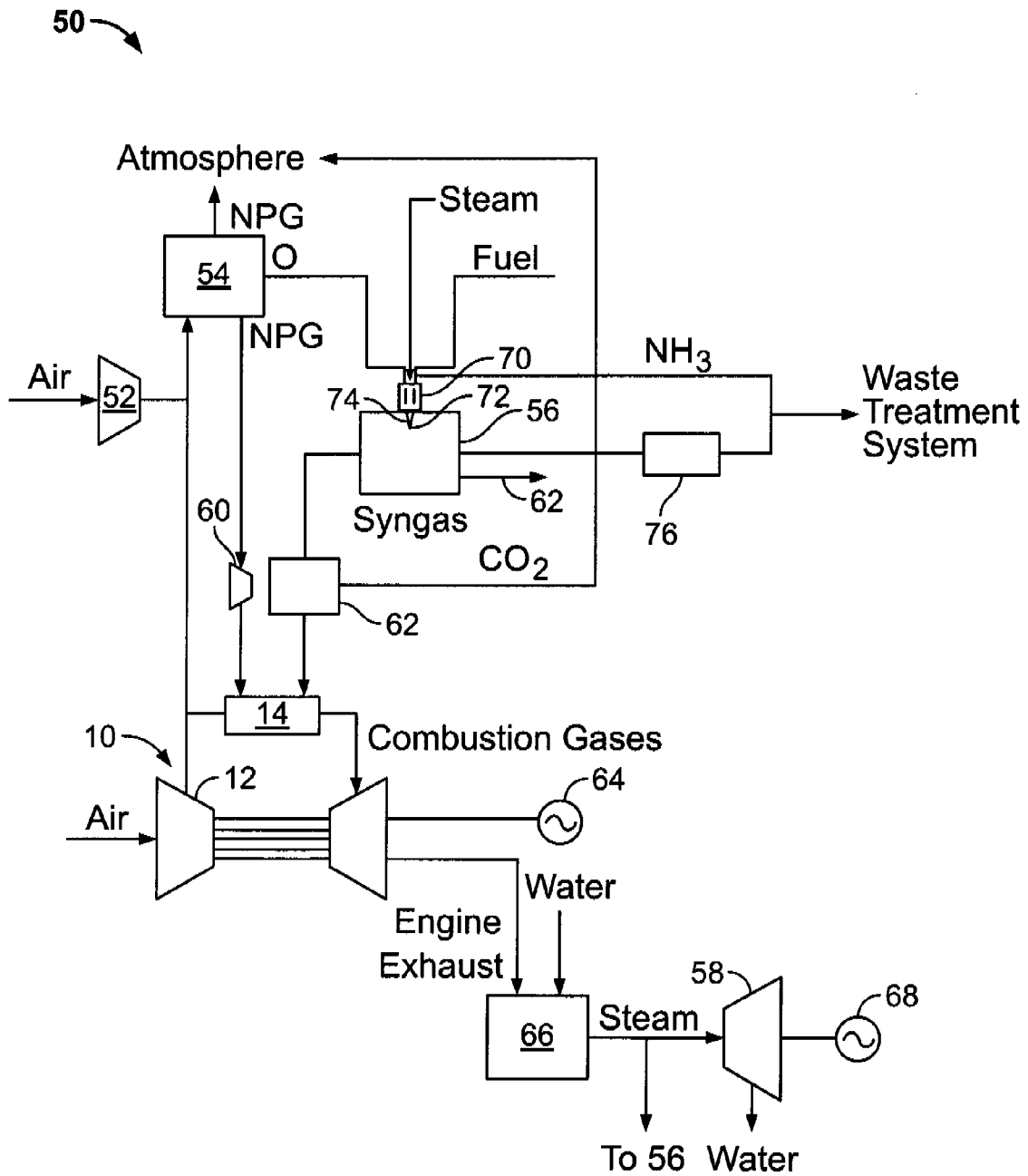
FIG. 1 is a schematic diagram of an exemplary integrated gasification combined-cycle (IGCC) power generation system.

FIG. 1 is a schematic diagram of an exemplary integrated gasification combined-cycle (IGCC) power generation system 50. IGCC system 50 generally includes a main air compressor 52, an air separation unit 54 coupled in flow communication to compressor 52, a gasifier 56 coupled in flow communication to air separation unit 54, a gas turbine engine 10, coupled in flow communication to gasifier 56, and a steam turbine 58. In operation, compressor 52 compresses ambient air. The compressed air is channeled to air separation unit 54. In some embodiments, in addition or alternative to compressor 52, compressed air from gas turbine engine compressor 12 is supplied to air separation unit 54. Air separation unit 54 uses the compressed air to generate oxygen for use by gasifier 56. More specifically, air separation unit 54 separates the compressed air into separate flows of oxygen and a gas by-product, sometimes referred to as a "process gas".

The process gas generated by air separation unit 54 includes nitrogen and will be referred to herein as "nitrogen process gas". The nitrogen process gas may also include other gases such as, but not limited to, oxygen and/or argon. For example, in some embodiments, the nitrogen process gas includes between about 95% and about 100% nitrogen. The oxygen flow is channeled to gasifier 56 for use in generating partially combusted gases, referred to herein as "syngas" for use by gas turbine engine 10 as fuel, as described below in more detail. In some known IGCC systems 50, at least some of the nitrogen process gas flow, a by-product of air separation unit 54, is vented to the atmosphere. Moreover, in some known IGCC systems 50, some of the nitrogen process gas flow is injected into a combustion zone (not shown) within gas turbine engine combustor 14 to facilitate controlling emissions of engine 10, and more specifically to facilitate reducing the combustion temperature and reducing nitrous oxide emissions from engine 10. IGCC system 50 may include a compressor 60 for compressing the nitrogen process gas flow before being injected into the combustion zone.

Gasifier 56 converts a mixture of fuel, the oxygen supplied by air separation unit 54, steam, and/or limestone into an output of syngas for use by gas turbine engine 10 as fuel. Although gasifier 56 may use any fuel, in some known IGCC systems 50, gasifier 56 uses coal, petroleum coke, residual oil, oil emulsions, tar sands, and/or other similar fuels. In some known IGCC systems 50, the syngas generated by gasifier 56 includes carbon dioxide. The syngas generated by gasifier 52 may be cleaned in a clean-up device 62 before being channeled to gas turbine engine combustor 14 for combustion thereof. Carbon dioxide may be separated from the syngas during clean-up and, in some known IGCC systems 50, vented to the atmosphere. Gasifier blowdown connection is coupled to a waste treatment system (not shown in FIG. 1). The power output from gas turbine engine 10 drives a generator 64 that supplies electrical power to a power grid (not shown). Exhaust gas from gas turbine engine 10 is supplied to a heat recovery steam generator 66 that generates steam for driving steam turbine 58. Power generated by steam turbine 58 drives an electrical generator 68 that provides electrical power to the power grid. In some known IGCC systems 50, steam from heat recovery steam generator 66 is supplied to gasifier 52 for generating the syngas.

In the exemplary embodiment, IGCC system 50 includes a syngas condensate stripper 76 configured to receive condensate from a stream of syngas discharged from gasifier 56. The condensate typically includes a quantity of ammonia dissolved in the condensate. At least a portion of the dissolved ammonia is formed in gasifier 56 from a combination nitrogen gas and hydrogen in gasifier 56. To remove the dissolved ammonia from the condensate the condensate in raised to a temperature sufficient to induce boiling in the condensate. The stripped ammonia is discharged from stripper 76 and channeled to a waste treatment system (not shown in FIG. 1). In an alternative embodiment, the stripped ammonia is returned to gasifier 56 at a pressure higher than that of the gasifier, to be decomposed in the relatively high temperature region of the gasifier proximate nozzle tip 72. The ammonia is injected such that the flow of ammonia in the vicinity of the high temperature area proximate nozzle tip 72 facilitates cooling nozzle tip 72.

Figure 2:
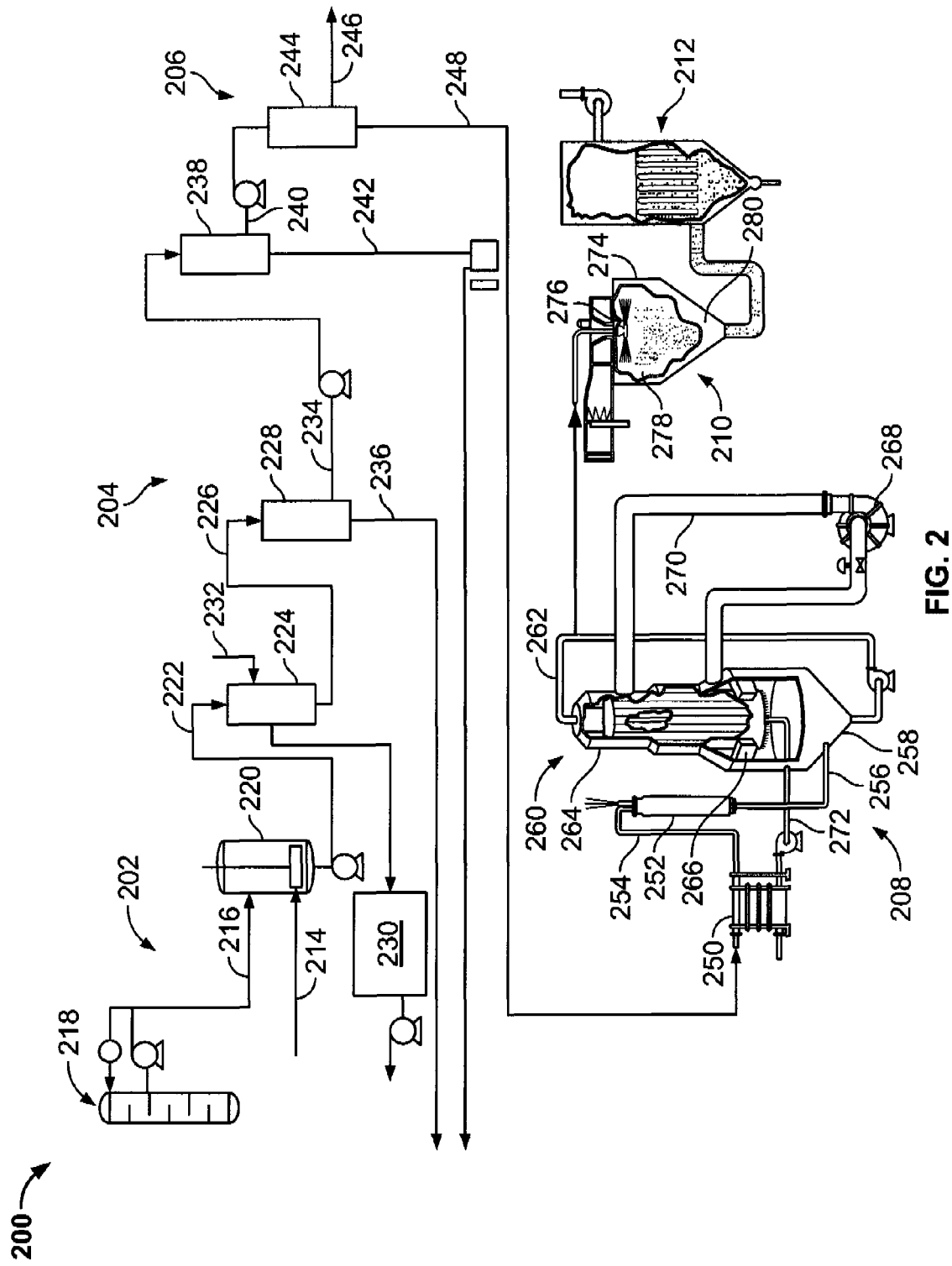
FIG. 2 is a schematic view of a zero discharge waste water treatment system in accordance with an exemplary embodiment of the present invention.

FIG. 2 is a schematic view of a zero discharge waste water treatment system 200 in accordance with an exemplary embodiment of the present invention. Waste water treatment system 200 a waste receiving subsystem 202, a filtration train 204, a reverse osmosis sub-system 206, a vapor recompression subsystem 208, a spray dryer 210, and a baghouse 212 coupled together in at least partial serial flow communication.

Process blowdown water 214 containing chloride, formate, and saturated in calcium and reflux water 216 from a process condensate stripper 218 are mixed in a precipitator vessel 220. In the exemplary embodiment, the blowdown water includes about 3,000 parts per million (ppm) chlorides, about 1,000 ppm formate, and calcium at a substantially saturated concentration. The reflux water includes a relatively high concentration of ammonium carbonate of about 10% by weight. The ammonium carbonate precipitates calcium from blowdown water 214. The precipitated calcium is pumped with precipitator effluent 222 to a sand filter 224. The precipitated calcium is filtered out of precipitator effluent 222 and a sand filter effluent 226 having less than about 50 ppm calcium is channeled to an ultrafiltration unit 228. Sand filter 224 is backflushed to a backflush receiving tank 230 using VR condensate 232. The calcium precipitate is then pumped to a gasification settling system, which concentrates the solid calcium precipitate and recycles it to the coal slurry feed, ultimately allowing it to be discharged as part of the discharge slag stream.

Sand filter effluent 226 is channeled to ultrafiltration unit 228, where a separation process using membranes with a pore size sized to reject molecules with molecular weight greater than about 1000 Daltons. Such pore size is large enough that salts and sugar molecules are capable of passing through the membrane into a permeate 234 ultrafiltration unit 228, however silica is removed from a portion of the filtered water using the ultrafiltration membrane. The ultrafiltration membranes may be configured in a hollow fiber, spiral wound, flat, sheet, tubular and ceramic. A retentate 236 of ultrafiltration unit 228 is returned to the gasification water system (not shown) as softened recycle grey water.

The silica free ultrafiltration permeate 234 is pumped to a nanofiltration system 238 which removes substantially all the formates and the remaining calcium from a nanofiltration system permeate 240 and concentrates the formate in a nanofiltration system retentate 242. The high formate retenate is recycled to the gasifier for destruction. Nanofiltration permeate 240 is channeled to a reverse osmosis subsystem 244 which extracts purified water as a reverse osmosis permeate 246 and concentrates chloride in a reverse osmosis retentate 248. The relatively high chloride and relatively low calcium reverse osmosis retentate 248 is channeled to vapor recompression system 208.

Reverse osmosis retentate 248 is pumped through a heat exchanger 250 that raises the temperature to the boiling point and then through a deaerator 252, which removes non-condensable gases such as carbon dioxide and oxygen from the heat exchanger effluent 254. Hot deaerated feed 256 is channeled to a sump 258 of an evaporator 260, where it combines with a recirculating brine slurry 262. Slurry 262 is pumped to the top of a bundle of heat transfer tubes 264, where it falls by gravity in a thin film down the inside of tubes 264. As slurry 262 falls, a small portion evaporates and the remaining falls into sump 258 to be recirculated. The vapor travels down tubes 264 with the brine, and is drawn up through a plurality of mist eliminators 266 and into a suction of a vapor compressor 268. Compressed vapor 270 flows to the outside of heat transfer tubes 264, where latent heat of compressed vapor 270 is transferred to the cooler brine slurry 262 falling inside of tubes 264. As vapor 270 gives up heat, it condenses as distilled water. The distillate 272 is pumped back through heat exchanger 250, where it transfers sensible heat to the incoming reverse osmosis retentate 248. A small amount of the brine slurry is continuously released from the evaporator to control density. Typically 95% of the reverse osmosis retentate 248 feed is converted to distillate having, for example, less than about 10 ppm total dissolved solids, for reuse in IGCC system 50.

A portion of slurry 262 is channeled to spray dryer subsystem 210. Slurry 262 enters a spray dryer vessel 274 through an atomizing wheel 276 spinning at a high speed, which sprays slurry 262 into a hot, gas-fired chamber 278. Water in slurry 262 instantly evaporates from the slurry droplets allowing solids entrained in slurry 262 to collect in a bin portion 280. From bin portion 280 the solids are pneumatically conveyed into baghouse 212 to be collected and used as a fertilizer, chemical feedstock or discarded as a waste.

The above-described filtering elements, such as filtration train 204, sand filter 224, ultrafiltration unit 228, and/or nanofiltration system 238, can be cleaned online using either vibration or spare streams with a backflow/purge of the offline screen to remove solids that have been filtered out of a fluid stream.

The exemplary embodiment permits integration of the IGCC process water system with the waste water treating system such that membrane filtration is used upstream of the vapor recompression and spray drying system. The use of the ultrafiltration, nanofiltration, and reverse osmosis membrane filtration reduces the rate of feed into the vaporizer permitting a smaller vaporizer size, improves vaporizer availability due to upstream removal of calcium, silica, and suspended solids, reduces salt production because formates are removed from the waste water and destroyed in the gasifier. The use of membrane filtration also eliminates the need for forced circulation in the evaporator due to a lower concentration of calcium, silica, and solids in the feed permits the falling film type evaporator to operate at higher concentration ratios eliminating the need for a forced circulation evaporator and because softened water is returned to the gasifier for use in, for example, the syngas scrubber and radiant cooler calcium deposition in such vessels and enables the use of a spray quench. The purified water from the vapor recompression system and RO membrane is used as cooling tower makeup or as feed water to the boiler water treating system.

Exemplary embodiments of IGCC zero discharge waste treatment systems are described above in detail. The waste treatment system components illustrated are not limited to the specific embodiments described herein, but rather, components of each system may be utilized independently and separately from other components described herein. For example, the waste treatment system components described above may also be used in combination with different IGCC system components.

The above-described IGCC zero discharge waste treatment system is cost-effective and highly reliable. In the exemplary embodiment, the IGCC zero discharge waste treatment system includes a membrane filtration train having subsequently smaller diameter porosity such that successively smaller molecules are removed from the waste stream. Retentate from the filtration train is returned to the gasifier for destruction and recycling and permeate from the final filtration stage is channeled to a vapor recompression system and spray dryer for recovery of the remaining water and collection of solids. As a result, the use of upstream membrane filters facilitates selection of a smaller capacity vapor compression subsystem and greater recovery of waste water for recycling and less waste discharge in the integrated gasification combined-cycle (IGCC) power generation system in a cost-effective and reliable manner.

While the invention has been described in terms of various specific embodiments, those skilled in the art will recognize that the invention can be practiced with modification within the spirit and scope of the claims.

What is claimed is:

1. A waste treatment system comprising:
   a filtration train comprising filter media having successively smaller diameter filtration elements;
   a reverse osmosis apparatus comprising a pump and a membrane coupled in flow communication with said filtration train;
   a vapor compressor coupled in flow communication with said reverse osmosis apparatus and configured to receive a retentate including a relatively high concentration of chlorides from said reverse osmosis apparatus; and
   a spray dryer coupled in flow communication with said vapor compressor, said spray dryer configured to separate moisture in a brine solution from particulate suspended in the brine solution.

2. A system in accordance with claim 1 coupled in flow communication with a gasifier wherein said filtration train is configured to:
   recycle a calcium precipitate stream to the gasifier for inclusion in a discharge slag stream of the gasifier; and
   recycle a formate rich stream to the gasifier for decomposition of the formate into syngas.

3. A system in accordance with claim 1 wherein said waste treatment system is configured to discharge a chloride stream in the form of a byproduct grade ammonium chloride salt or solution.

4. A system in accordance with claim 1 wherein said filtration train comprises a precipitator configured to:
   receive a first stream comprising first soluble ions;
   receive a second stream comprising second soluble ions; and
   mix the first stream and the second stream together such that the first and second ions combine to form an insoluble compound that settles out of solution as a solid in a precipitator effluent flow.

5. A system in accordance with claim 4 wherein the first soluble ions comprise calcium ions.

6. A system in accordance with claim 4 wherein the second soluble ions comprise carbonate ions.

7. A system in accordance with claim 4 wherein said filtration train comprises a sand filter in flow communication with said precipitator, said sand filter is configured to remove substantially all the insoluble compound from the precipitator effluent.

8. A system in accordance with claim 4 wherein said filtration train comprises an ultrafiltration system in flow communication with said sand filter, said ultrafiltration system configured to remove substantially all silica from an effluent of the sand filter.

9. A system in accordance with claim 4 wherein said filtration train comprises a nanofiltration system in flow communication with said ultrafiltration system, said nanofiltration system configured to remove substantially all formates and calcium from an effluent of the ultrafiltration system.

10. A system in accordance with claim 4 further comprising a baghouse in flow communication with said spray dryer, said baghouse configured to pneumatically convey salt particulate from said spray dryer to a salt storage bin.

11. A method of treating waste liquids from a process comprising:
    combining a first waste stream and a second waste stream to generate a third waste stream including a precipitate;
    filtering the third waste stream such that the precipitate is substantially removed from the third waste stream;
    filtering the substantially precipitate free waste stream using an ultrafiltration membrane such that silica is substantially removed from at least a portion of the filtered waste stream;
    filtering the substantially silica free waste stream using a nanofiltration membrane such that substantially all formates and remaining calcium are removed from the permeate and the formate is concentrated in the retentate;
    pressurizing the nanofiltered permeate on a high pressure side of a reverse osmosis membrane to generate permeate on the low pressure side that is substantially free of chlorides and to generate retentate including a relatively high concentration of chlorides; and channeling the reverse osmosis retentate to a vapor compressor.

12. A method in accordance with claim 11 wherein said first waste stream comprises process blowdown water including at least one of chlorides, formates, and calcium.

13. A method in accordance with claim 11 wherein said second waste stream comprises reflux water including ammonium carbonate.

14. A method in accordance with claim 11 wherein combining a first and second waste stream comprises precipitating calcium from the first waste stream using ammonium carbonate from the second waste stream.

15. A method in accordance with claim 14 wherein filtering the third waste stream comprises filtering the precipitated calcium using a sand filter.

16. A method in accordance with claim 11 wherein filtering the substantially precipitate free waste stream comprises channeling a remaining portion of the filtered waste stream to the process.

17. A method in accordance with claim 11 further comprising channeling a vapor recompression cycle retentate from the vapor compressor to a spray dryer process to concentrate chlorides in the retentate into a solid salt.

18. An integrated gasification combined-cycle (IGCC) power generation system comprising:
   a gasifier comprising a blowdown system configured to remove blowdown water with a relatively high concentration of impurities from the gasifier wherein said relatively high concentration of impurities comprises at least one of about 3000 parts per million (ppm) chlorides, about 1000 ppm formate, and calcium at about saturation concentration;
   a condensate stripper configured to separate ammonia entrained in a gasifier process condensate stream from the condensate; and
   a waste treatment system configured to process the blowdown water and the stripped ammonia by mixing the blowdown water and the stripped ammonia to form waste streams that are at least one of recycled back into said gasifier and collected as a solid waste such that the waste stream produces substantially zero liquid discharge, wherein said waste treatment system comprises:
   a reverse osmosis system configured to separate an effluent into a reverse osmosis system effluent comprising substantially no chlorides and a waste stream comprising a retentate of the reverse osmosis system; and
   a vapor recompression and spray drying system configured to separate the retentate into a vapor compression distillate and a solid waste product comprising chlorides.

19. A system in accordance with claim 18 wherein said waste treatment system comprises:
   a precipitator configured to receive and mix the blowdown water, and the ammonia and remaining condensate such that an insoluble solid precipitate is generated in a precipitator effluent;
   a sand filter configured to remove the precipitate from the precipitator effluent;
   an ultrafiltration system configured to separate the precipitator effluent into an ultrafiltration system effluent comprising substantially no silica and a waste stream comprising a portion of the precipitator effluent comprising silica;
   a nanofiltration system configured to separate the ultrafiltration system effluent into a nanofiltration system effluent comprising substantially no formates and a waste stream comprising a portion of the ultrafiltration system effluent comprising formates,
   said reverse osmosis system configured to separate the nanofiltration system effluent into the reverse osmosis system effluent and the waste stream comprising the retentate.

20. A system in accordance with claim 19 wherein the ultrafiltration and nanofiltration systems waste streams are channeled to the gasifier and the reverse osmosis effluent and the vapor compression distillate are channeled to an IGCC plant make-up.

* * * * *